United States Patent [19]

Giuliani et al.

[11] Patent Number: 5,024,751
[45] Date of Patent: Jun. 18, 1991

[54] CATALYTIC COMPOSITION COMPRISING A METAL SULFIDE SUSPENDED IN A LIQUID CONTAINING ASPHALTENES AND HYDROVISBREAKING PROCESS OF A HYDROCARBON CHARGE

[75] Inventors: Pierre Giuliani, Grenoble; Jean-Francois Le Page, Rueil Malmaison; Jean-Claude Plumail, Nanterre; Marcellin Espaillac, Viroflay, all of France

[73] Assignee: Institut Francais du Petrole, Rueil-Malmaison, France

[21] Appl. No.: 353,836

[22] Filed: May 18, 1989

[30] Foreign Application Priority Data

May 19, 1988 [FR] France ............................... 88 06839
May 19, 1988 [FR] France ............................... 88 06840

[51] Int. Cl.$^5$ ............................................. C10G 47/06
[52] U.S. Cl. .................................. 208/108; 208/107; 502/220
[58] Field of Search ............... 208/108, 112, 215, 210, 208/107; 502/168, 216

[56] References Cited

U.S. PATENT DOCUMENTS

| | | | |
|---|---|---|---|
| 3,477,963 | 11/1969 | van Venrooy | 208/215 |
| 3,622,497 | 11/1971 | Gleim | 208/251 |
| 3,622,498 | 11/1971 | Stolfa et al. | 208/108 |
| 3,622,503 | 11/1971 | Hausler | 208/215 |
| 3,645,912 | 2/1972 | Gatsis | 208/215 |
| 3,694,352 | 9/1972 | Gleim | 208/215 |
| 4,045,331 | 8/1977 | Ward | 208/215 |
| 4,119,528 | 10/1978 | Baird et al. | 208/143 |
| 4,468,316 | 8/1984 | Swanson | 208/59 |
| 4,560,465 | 10/1985 | Yu et al. | 208/59 |
| 4,719,195 | 1/1988 | Toulhoat et al. | 502/216 |

*Primary Examiner*—Anthony McFarlane
*Attorney, Agent, or Firm*—Millen, White & Zelano

[57] ABSTRACT

The invention relates to a process of catalytic hydrovisbreaking of a hydrocarbon charge comprising the following stages:

a) Mixing the charge to be treated with a gas containing hydrogen in an amount sufficient for carrying out the hydrovisbreaking reaction, b) introducing into the hydrogen-hydrocarbon charge mixture an amount of a catalytic composition that is sufficient for obtaining a content of metals in the charge to be treated ranging from about 10 to 2,000 ppm by weight in relation to the weight of the charge, said catalytic composition being obtained with a method comprising the following stages:

1) subjecting to a thermal treatment under the globally reducing atmosphere of a gas containing hydrogen, the mixture obtained by contacting, in any order, at least one compound other than a sulfide of at least one metal with a hydrocarbon charge containing asphaltenes and with at least one organic polysulfide 2) heating the product resulting from statge (b) in the presence of a gas containing hydrogen, and c) subjecting the product resulting from stage (b) to hydrovisbreaking conditions for a time sufficient for carrying out the hydrovisbreaking of the charge to be treated.

7 Claims, 1 Drawing Sheet

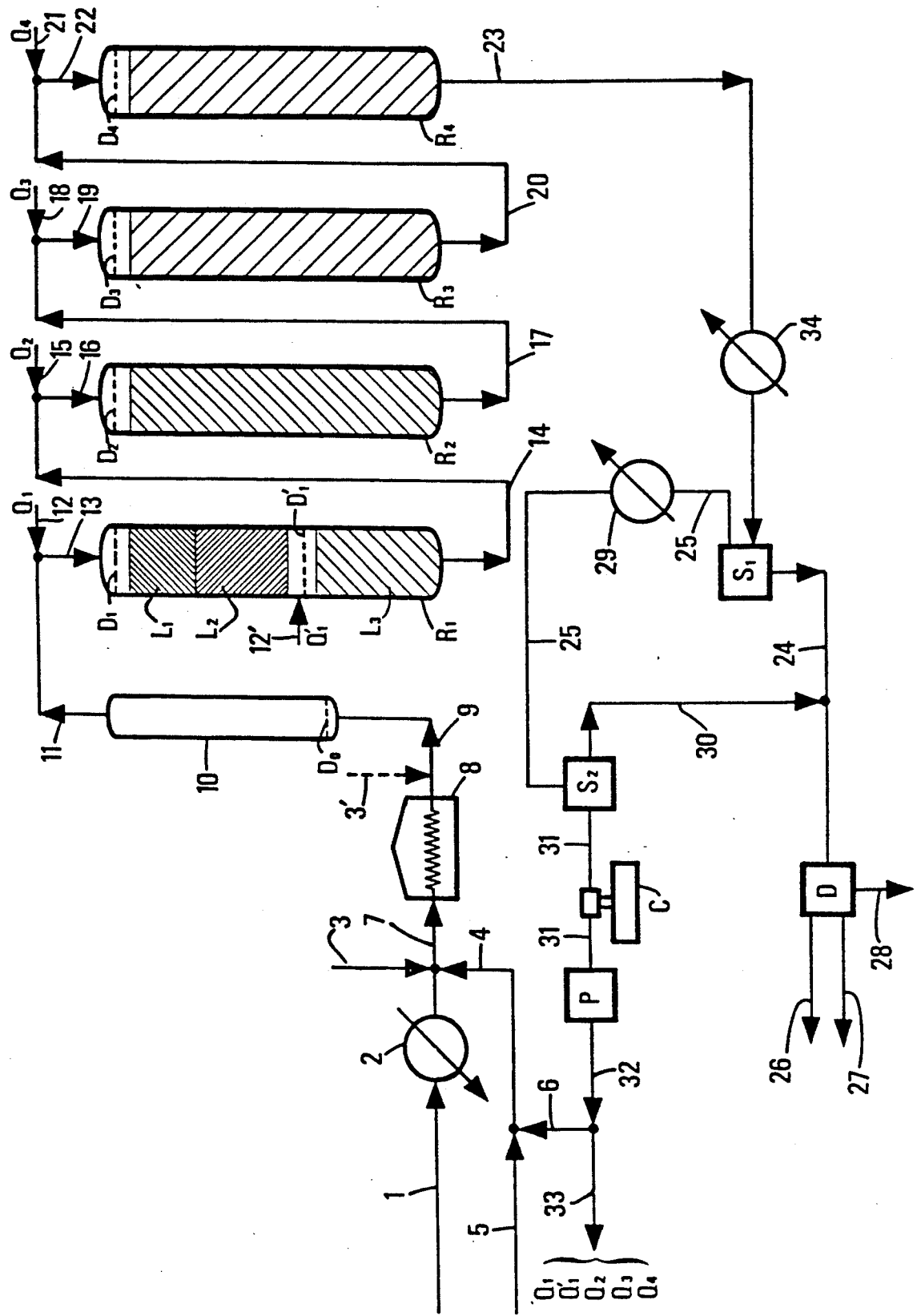

CATALYTIC COMPOSITION COMPRISING A METAL SULFIDE SUSPENDED IN A LIQUID CONTAINING ASPHALTENES AND HYDROVISBREAKING PROCESS OF A HYDROCARBON CHARGE

BACKGROUND OF THE INVENTION

The present invention relates to a process for the catalytic hydrovisbreaking of a hydrocarbon charge in the presence of a catalytic composition comprising at least one metal selected among the metals from groups VI B, VII B and VIII of the periodic table of elements (Handbook of Chemistry and Physics, 37th edition, 1956, pp. 392–393). It concerns more particularly a process for hydrovisbreaking heavy petroleum fractions in order to convert them into lighter fractions.

Numerous processes for visbreaking or hydrovisbreaking hydrocarbon charges have been described in prior art and it is well-known that the conversion, which is carried out at a high temperature, depends on the operating conditions. However, when the operating conditions are too severe (high temperature and long residence time), unstable products form and there is also a risk of coke forming.

A means which is well-known by the man skilled in the art for compensating for this disadvantage consists in continuously injecting into the charge to be treated a metal or a metal compound having in the thermal treatment conditions a hydrogenizing activity (EP A 181,253, U.S. Pat. No. 4,655,905). The metal which is most often used to do this is molybdenum, which shows a hydrogenizing activity in the presence of hydrogen sulfide ($H_2S$).

Besides, it is also known by the person skilled in the art that it is advantageous to utilize, in the processes for visbreaking and/or hydrovisbreaking hydrocarbon charges, a catalyst in the form of a sulfide. As a matter of fact, said form shows a catalytic activity and a stability which are higher than those of the other forms which can be used, especially those of oxides.

It is also known that, apart from the quality of the catalytic precursor which is used, it is advisable to obtain catalysts that are well scattered in the charge to be treated.

SUMMARY OF THE INVENTION

Surprisingly enough, it has now been discovered that the use of a catalytic composition, which is also the object of the present invention, comprising at least one sulfide of at least one metal selected among the metals from groups VI B, VII B and VIII, obtained according to a particular method described hereafter, in the catalytic hydrovisbreaking processes of hydrocarbon charges allows to obtain a very high conversion of the heavy fractions into lighter fractions, without any excessive coke forming and by simultaneously improving the quality of the residues (improved removal ratio of sulfur from asphaltenes and metals).

Thanks to the very high conversion of a heavy fraction into a lighter fraction without any excessive coke forming, the unit utilizing the catalytic hydrovisbreaking process according to the invention can be followed in combination by a hydrodemetallization unit which itself will be followed by a desulfurization unit, all units in which the service life of the catalysts is improved.

DETAILED DESCRIPTION OF THE INVENTION

The catalytic hydrovisbreaking process of a hydrocarbon charge according to the present invention comprises the following stages:

(a) Mixing the charge to be treated with a gas containing hydrogen in an amount sufficient for carrying out the hydrovisbreaking reaction and the mixture is brought up to a temperature of at least 330° C., (b) Introducing into the hydrogen-hydrocarbon charge mixture an amount sufficient for obtaining a metal content in the charge to be treated ranging from about 10 to 2,000 ppm by weight in relation to the weight of the charge, of a catalytic composition obtained with a method comprising the following stages:

(1) subjecting to a thermal treatment at a temperature ranging from 80° to 250° C., preferably from 100° to 180° C., for 0.1 to 24 hours, under the globally reducing atmosphere of a gas containing hydrogen (for example under hydrogen scavenging), the mixture obtained by contacting, in any order, at least one compound other than a sulfide of at least one metal selected among the metals from groups VI B, VII B and VIII of the periodic table of elements with a hydrocarbon charge containing asphaltenes and with at least one organic polysulfide of the formula $R^1-(S)_n-R^2$ where each of $R^1$ and $R^2$, which are identical or different, represents a hydrocarbon radical and n is an integral number ranging from 2 to 20, the amount of metal compound and of asphaltenes being such that the ratio by weight of metal to asphaltenes ranges from about 0.05:1 to 10:1, preferably from 0.1:1 to 5:1 and most often from 0.2:1 to 3:1, and the amount of organic polysulfide that is utilized being sufficient for introducing a sulfur amount at least equal to the amount of sulfur that is necessary for the substantially complete conversion of the most part of the metal amount which is present into a sulfurized metallic compound which is a catalytic precursor, and (2) heating the product resulting from stage (1) in the presence of a gas containing hydrogen, under a hydrogen partial pressure ranging from about 0.5 to 20 MPa, preferably from about 1 to 15 MPa and most often from about 2 to 10 MPa, at a temperature ranging from about 260° to 450° C., preferably from about 300° to 400° C., for a duration ranging from 0.1 to 24 hours, and (c) Subjecting the product resulting from stage (b) to hydrovisbreaking conditions for a time sufficient for performing the hydrovisbreaking of the charge to be treated.

Stage (2) of the preparation of the catalytic composition used in the process of the present invention allows to convert the catalytic precursor obtained in stage (1) into a finely divided heterogenous catalyst and to obtain thus a particularly active catalytic composition.

All the metals of groups VI B, VII B and VIII can be utilized within the scope of the present invention. Molybdenum, tungstene, chromium, manganese, nickel and cobalt can be cited for example.

Molybdenum or molybdenum-nickel and molybdenum-cobalt associations will be preferably utilized.

The metal compound used in stage (1) of the preparation of the catalytic composition is preferably an oxide, a salt of an organic acid such as for example an octate or a naphthenate, a polyacid such as for example an isopolyacid or a heteropolyacid or a polyacid salt of said metal.

The metal which is used most often is molybdenum, which is usually utilized in the form of a compound selected from the group constituted by the molybdenum blues, phosphomolybdic acid, phosphomolybdic acid salts and molybdenum salts of organic acids such as for example molybdenum octate and molybdenum naphthenate.

The metal compound used in stage (1) of the preparation of the catalytic composition is usually introduced in the form of a solution in a solvent selected from the group constituted by water, organic solvents and the water-organic solvent mixtures or an emulsion in a water-organic solvent mixture.

Among the organic solvents that can be used, hydrocarbons, alcohols, ethers, ketones, esters, amides, phenols and nitriles can for example be cited. Alcohols are preferably used, for example those having 1 to 24 carbon atoms in their molecule and particularly alcohols or alcohol mixtures having 3 to 18 carbon atoms in their molecule (for example oxo alcohol, ethylhexanol, or isopropyl alcohol).

It is also possible to utilize a metallic salt dissolved in water and add to it an organic solvent, for example a miscible solvent. A solution or an emulsion of the metal compound in a water-organic solvent mixture is thus obtained. This organic solvent will preferably comprise at least one alcohol with 3 to 18 carbon atoms in its molecule.

As an example, in the case of molybdenum, one can use phosphomolybdic acid prepared from an aqueous solution of phosphoric acid and molybdenum trioxide which is made boil under reflux for at least 10 minutes. The aqueous solution of phosphomolybdic acid which is thus obtained is relatively economical and this solution can be utilized as it is or after addition of an organic solvent.

The metal(s) content of the solution or the emulsion used in stage (1) of the preparation of the catalytic composition for introducing the metal(s) compound(s) usually ranges from 1 to 40% by weight, preferably from 10 to 30% by weight.

The hydrocarbon charge containing asphaltenes which is used is generally an atmospheric or a vacuum distillation residue, or a heavy petroleum containing a considerable amount of asphaltenes. This hydrocarbon charge may also be one of the charges cited above, mixed with a cut rich in aromatic compounds such as for example a cut from a light distillate (light cycle oil:LCO) or a cut selected among the heavy cycle oils (generally called HCO), resulting for example from a catalytic cracking unit, for example 180°-365° C., 160°-341° C. cuts for a LCO or 320°-500° C. cuts for a HCO resulting from said cracking.

The mixture subjected to the thermal treatment of stage (1) of the preparation of the catalytic composition can for example comprise:

(a) 10 to 30% by volume of the metal compound solution, for example an aqueous solution or a solution in a water-solvent mixture or a solution in an organic solvent, the organic solvent being in the last two cases preferably an alcohol or a mixture of alcohols such as described above, (b) 30 to 50% of a hydrocarbon cut containing asphaltenes, for example a vaccuum or an atmospheric distillation residue and (c) 30 to 50% of a cut rich in aromatic compounds resulting from a catalytic cracking unit, for example a 180°-365° C. or a 160°-341° C. LCO cut.

According to the present invention, the word "asphaltene" refers to the compounds of the petroleum fraction that is utilized and which are soluble in benzene at its boiling point temperature and insoluble in n-heptane at its boiling point temperature.

The organic polysulfide that is used in stage (1) of the preparation of the catalytic composition is a compound of the formula $R^1$—$(S)_n$—$R^2$ where n is an integral number ranging from 2 to 20, preferably from 3 to 10 and most often from 4 to 7, $R^1$ and $R^2$ are identical or different, each of them representing a hydrocarbon radical generally containing 1 to 150 carbon atoms, preferably 5 to 60 carbon atoms, most preferably 5 to 40 carbon atoms and most often 7 to 16 carbon atoms, while $R^1$ can also represent one hydrogen atom. Among the hydrocarbon radicals, saturated or unsaturated, linear or branched aliphatic radicals, cycloaliphatic radicals and aryl radicals can be cited for example. In the formula above, $R^1$ and $R^2$ preferably represent a linear or branched alkyl radical, an aryl radical, an aryl-alkyl (aralkyl) radical or a cycloalkyl radical which can be for example naphthenic. Among the organic polysulfides, ditertiododecyl polysulfide can for example be cited (n=5), where $R^1$ and $R^2$ represent each a tertiary dodecyl radical, marketed for example by the ELF-AQUITAINE company under the name TPS 32 because it contains about 32% by weight of sulfur, ditertiononyl polysulfide (n=5), where $R^1$ and $R^2$ are each a tertiary nonyl radical, for example marketed by ELF-AQUITAINE under the name TPS 37 and by the PENWALT company under the name TNPS, the polysulfurized olefins containing for example about 30 to 70% by weight of sulfur such as those described for example in U.S. Pat. No. 3,471,404 or in the french patent which has been applied for by the applicant on Oct. 17, 1986 under the national registration number 86-14,576. The amount of organic polysulfide which is utilized must be sufficient to allow the substantially complete conversion of the most part of the metal present into a sulfurized metallic compound which is a catalytic precursor. The phrase "most part" means at least 50% within the scope of the present invention. The amount of organic polysulfide is preferably chosen so that it allows the substantially complete conversion of at least 60% and most often at least 80% and for example of the total amount of metal into a sulfurized metallic compound. This minimum amount can be easily determined from the weight of the metal present and by considering that the sulfur which is contained in the organic polysulfide that is utilized is used in its entirety in order to form one or several sulfurized metallic compounds. This amount is generally such that at least 1.5 gram-atom (g.at) of sulfur per gram-atom of metal is introduced. This amount usually ranges from 1.5:1 to 10:1 g.at of sulfur per 1 g.at of metal and preferably from 2:1 to 5:1.

The duration of this stage (1) of forming of the sulfurized metallic catalytic precursor must be sufficient for ensuring the substantially complete sulfurization of the most part of the metal present. This stage (1) usually ranges from 0.1 to 24 hours, most often from 0.1 to 10 hours and preferably from 0.2 to 4 hours.

This first stage (1) of preparation of the catalytic composition used in the process according to the invention must imperatively be performed under a globally reducing atmosphere in the presence of a gas containing hydrogen. It can be carried out under a standard pressure or under a higher pressure, for example up to about 25 MPa with a partial hydrogen pressure which can be high, for example up to 20 MPa. This stage is preferably performed under gas scavenging, preferably with a gas containing hydrogen. The gas containing hydrogen can be a substantially pure hydrogen or industrial hydrogen, for example a recycle gas from the conversion unit of the hydrocarbon charge which generally contains a low amount of hydrogen sulfide ($H_2S$). The $H_2S$ content will preferably be smaller than 5% by volume and most often smaller than 3% by volume. The gas flow rate is usually chosen so that the ratio by volume of hydrogen to hydrocarbons ranges from about 50:1 to about 2,000:1.

The product resulting from stage (1) of the preparation of the catalytic composition is then heated at a temperature ranging from about 260° to 450° C. in the presence of a gas containing hydrogen, under a hydrogen partial pressure ranging from about 0.5 to 20 MPa for a duration sufficient for converting the sulfurized catalytic precursor obtained in stage (1) into a sulfurized heterogenous catalyst, finely divided and in suspense in the liquid phase, and thus obtaining the catalytic composition which is utilized in the present invention. The duration of this stage (2) generally ranges from about 0.1 to 24 hours, most often from about 0.1 to 10 hours and preferably from about 0.1 to 2 hours.

The catalytic composition utilized in the present invention is usually prepared by using such amounts of metals that the metal concentration in the final composition expressed in weight of metal in relation to the total composition weight generally ranges from about 0.01 to 4%, preferably from about 0.1 to 2% and most often from about 0.2 to 1%.

The catalytic composition which is obtained with the process described above, comprising the use of an organic polysulfide as a sulfurization agent and the use of an amount of metal in a particular ratio to the amount of asphaltenes present, allows to obtain a very well scattered sulfurized precursor and thus a catalytic composition or concentrate which is particularly active in the process of visbreaking and/or hydrovisbreaking of hydrocarbon charges. Surprisingly enough, as it is shown in the examples hereafter, the catalytic compositions obtained according to the invention by sulfurization with a polysulfide are markedly more active than those obtained by sulfurization with a hydrogen sulfide, which was conventionally used in prior art, other things being equal.

The hydrocarbon charges to be treated in the process according to the invention are heavy charges usually containing hetero-atomic impurities such as for example sulfur-containing, nitrogen-containing and/or metallic impurities. Among these charges, one can cite, without this list being restrictive, atmospheric distillation residues, vacuum distillation residues, heavy crudes, deasphalted oils and coal hydrogenates.

The present invention relates to hydrovisbreaking processes in the presence of a catalyst in suspense (slurry processes) and particularly to a hydrovisbreaking process where one adds to a hydrocarbon charge which has been previously brought up to a temperature of at least 330° C., generally ranging from 330° to 550° C. and preferably from 350° to 450° C., an amount of the catalytic composition described above that is sufficient for obtaining a metal content in relation to the charge to be treated which usually ranges from about 10 to 2,000 ppm by weight, preferably from about 20 to 1,500 ppm and most often from about 25 to 500 ppm by weight and this mixture is subjected to a thermal treatment in the presence of hydrogen in hydrovisbreaking conditions.

In a preferred embodiment of the hydrovisbreaking process of the present invention, an amount of hydrogen sufficient for carrying out the hydrovisbreaking will be previously added to the hydrocarbon charge to be treated and the latter will then be brought up to a temperature of at least 330° C., generally ranging from 330° to 500° C., preferably from 350° to 450° C., in a preheat still and the catalytic composition will be introduced into said charge preferably immediately at the outlet of the preheat still, the mixture being then fed into the hydrovisbreaking reactor and put in the hydrovisbreaking conditions (stage (c) of the process of the present invention), that is usually a total pressure ranging from about 3 to 30 MPa, preferably from 8 to 20 MPa, a charge residence time ranging from about 5 minutes to 16 hours, preferably from about 10 minutes to 4 hours, a temperature ranging from about 350° to 500° C., preferably from about 350° to 450° C. and an amount by volume of hydrogen measured at a standard temperature and pressure in relation to the charge ranging from about 100:1 to 5,000:1 and preferably from about 150:1 to 2,000:1.

The process of catalytic hydrovisbreaking of a hydrocarbon charge can be utilized in an integrated hydrotreatment process of said charge combining the following processes:

(1) a catalytic hydrovisbreaking process according to the invention, (2) a catalytic hydrodemetallization process, (3) a catalytic hydrodesulfurization process.

At the end of the hydrovisbreaking process (1) described above, the effluent, mixed with hydrogen, is carried on a hydrodemetallization catalyst comprising a refractory mineral support, for example alumina, and at least one metal in the free or in the combined form from at least one of groups VB (vanadium group), VIB (molybdenum group) and VIII (cobalt and nickel group) (US table).

The catalyst has the following physical properties:
a specific surface ranging from 100 to 350 $m^2/g$ and preferably from 120 to 250 $m^2/g$,
a pore volume ranging from 0.5 to 2 $cm^3/g$ and preferably from 0.6 to 1.3 $cm^3/g$.

Said catalyst contains, in the free or in the combined form, apart from the support, in relation to the total catalyst weight, 0.01 to 25% by weight, calculated in element, of at least one metal selected from groups VB, VIB and VIII of the periodic table of elements.

The catalyst may contain only small contents of metals, for example 0.01 to 0.7%, as described in french patent No. 2,570,385, if the catalyst is supposed to have only a demetallizing function.

It may contain a higher proportion, for example 5 to 10% by weight of molybdenum and 2.5 to 8% by weight of nickel as for example in french patent No. 2,598,632, if the catalyst is wanted to have, apart from its demetallizing function, a converting function, one of the characteristics of the catalysts claimed in said patent being also a particular spectrum when they are examined with a RAMAN microprobe.

Other catalysts that can be utilized are those which are described in french patent No. 2,617,498 in the applicant's name and are constituted of several juxtaposed agglomerates, each of them consisting of several small acicular plates, the latter being generally oriented in each agglomerate radially in relation to each other and in relation to the agglomerate centre.

The hydrodemetallization operation can be carried out in the following conditions:
temperature ranging from 300° to 450° C.
pressure ranging from 2.5 to 25 MPa $$\frac{\text{hydrogen}}{\text{hydrocarbons}}$$

volume ratio ranging from 50 to 3,000 standard liters/liter
hourly volume velocity of the charge, measured in the liquid state, preferably ranging from 0.1 to 5 (the hourly volume velocity being the volume of liquid passing on a catalyst volume unit per hour).

Previously to the hydrometallization operations of the hydrocarbon charges, it can be advantageous to presulfurize the catalyst in the presence of hydrogen, by well-known processes; the temperature is generally brought up to about 350° to 400° C. while one passes on the catalyst the compounds which may release sulfur, such as mixtures of hydrogen and hydrogen sulfide, mercaptans or carbon bisulfide, or even a gas-oil containing sulfur.

The hydrodemetallization process can be implemented by using only one moving, fixed or expanded catalyst bed, as described in french patent No. 2,538,814 in the applicant's name.

In a preferred embodiment of the hydrodemetallization process described in french patent No. 2,617,498 in the applicant's name, the effluent from the hydrovisbreaking process is passed with hydrogen through at least two different catalyst beds, the first bed being constituted of particles with an average diameter ranging from 2.5 to 6 mm and the second bed being constituted of particles with an average diameter ranging from 0.5 to 2.5 mm.

According to an even preferred embodiment of the hydrodemetallization process, the second stage is implemented with several successive beds utilizing three catalysts with a different granulometry:
1st bed: 10 to 30% by weight of the total; particles diameter ranging from 3.6 to 4.5 mm,
2nd bed: 10 to 30% by weight of the total; particles diameter ranging from 2.5 to 3.5 mm,
that is to say: 1st and 2nd beds: 20 to 40% by weight of the total,
3rd bed and possibly 4th bed: the 100% complement, that is to say 60-80%; particles diameter ranging from 0.7 to 2 mm.

The 1st bed is preferably a moving bed, which means that the catalyst is periodically drawn off. Thus, the catalytic residues of the hydrovisbreaking process which have been trapped by the catalyst can be carried away, which avoids clogging the bed.

The other beds are fixed beds.

At the end of hydrodemetallization process (2), the effluent of said process, mixed with hydrogen, is carried on a hydrodesulfurization catalyst comprising a refractory mineral support, for example alumina, and, in a free or combined form, molybdenum and nickel and/or cobalt.

The catalyst shows the following physical properties:
a specific surface ranging from 150 to 350 m²/g, preferably from 200 to 350 m²/g,
a pore volume ranging from 0.7 to 2 cm³/g, preferably from 0.7 to 1.2 cm³/g.

They can contain:
(a) in the free or combined form, 0.5 to 30% by weight, in relation to the total catalyst weight, of molybdenum,
(b) in the free or combined form, 0.5 to 10% by weight, in relation to the total catalyst weight, of at least one metal selected from the group constituted by nickel and cobalt.

It can be for example catalysts claimed in french patents Nos. 2,560,389 or 2,598,631.

The operating conditions of the hydrodesulfurization process are substantially the same as those of the hydrodemetallization process.

The included FIGURE illustrates, in a non limiting way, an embodiment of the integrated hydrotreatment process of a hydrocarbon charge combining the following processes:
(1) catalytic hydrovisbreaking according to the invention,
(2) catalytic hydrodemetallization,
(c) catalytic hydrodesulfurization.

According to the FIGURE, the hydrocarbon charge to be treated is introduced through line 1 into the unit utilizing the integrated hydrotreatment process. After preheating in heater 2, it is mixed with the catalyst introduced through line 3 and with a hydrogen-rich gas introduced through line 4, a mixture of make-up gas from line 5 and of recycle gas from line 6. The mixture of charge, gas and catalyst is introduced into furnace 8 through line 7.

In the furnace, the mixture is brought up to a temperature of at least 330° C., usually ranging from 330° to 500° C., preferably from 350° to 450° C.

The effluent coming out of furnace 8 through line 9 is led into soaker 10 via distribution device Do.

The hydrovisbreaking catalyst can also be introduced after furnace 8 through line 3". It can be introduced as well through lines 3 and 3".

The residence time of the effluent in the soaker ranges from about 5 minutes to 16 hours, preferably from about 10 minutes to 4 hours.

The total pressure ranges from about 3 to 30 MPa, preferably from 8 to 20 MPa.

The temperature ranges from about 350° to 500° C., preferably from about 350° to 450° C. The $$\frac{\text{hydrogen}}{\text{hydrocarbons}}$$

volume ratio ranges from 100 to 5,000 preferably from 150 to 2,000 standard liters/liter.

The effluent coming out of soaker 10 through line 11 is going to be subjected to hydrodemetallization and hydrodesulfurization treatments in four successive reactors:
two hydrodemetallization reactors R1 and R2
two hydrodesulfurization reactors R3 and R4.

In the first reactor R1, there are three beds L1, L2 and L3 of a demetallization catalyst the alumina support of which is of the acicular type (See french patent No. 2,617,498) containing about 14% by weight of molybdenum oxide $MoO_3$ and 3% by weight of nickel oxide NiO.

The various beds differ in the granulometry of the catalyst which comes in the form of balls with a diameter of:
0.42 cm for the 1st bed
0.28 cm for the 2nd bed 0.18 cm for the 3rd bed.

Reactor R1 is equipped with two distribution devices D1 and D'1, device D1 being located at the reactor head and device D'1 between the 2nd and the 3rd bed.

Reactor R1 is also equipped with quenching devices Q1 and Q'1. The quenching fluid, preferably cold hydrogen, is supplied through lines 12 and 12', preferably immediately above the distribution plates.

The mixture of hydrogen from line 12 and of effluent from line 11 is introduced through line 13 into reactor R1.

Bed L1 is a moving bed, that is to say that the catalyst is periodically drawn off. Thus, as it has been previously said, the catalytic residues from the hydrovisbreaking process can be carried away, which avoids clogging the bed. The catalyst draw off and make-up devices have not been represented on the figure for reasons of simplification.

Beds L2 and L3 are fixed beds.

The temperature in reactor R1 is preferably lower than 435° C., the global hourly volume velocity preferably ranges from 0.8 to 2, and the pressure is limited to that of the soaker, except for the pressure drops.

When it comes out of recator R1 through line 14, the effluent of said reactor is led through line 16 after addition, through line 15, of a quenching fluid, preferably cold hydrogen, into a second hydrodemetallization reactor R2 equipped with a quenching device Q2.

Reactor R2, fitted with a distribution device D2, contains a catalyst identical to that of the 3rd bed L3 in reactor R1. The catalyst is placed on a fixed bed.

The temperature in reactor R2 preferably ranges from 390° to 430° C., the pressure being limited to that of the soaker, except for the pressure drops.

When it comes out of reactor R2 through line 17, the efluent of said reactor is led through line 19, after addition through line 18 of a quenching fluid, preferably cold hydrogen, into a first hydrodesulfurization reactor R3 equipped with a quenching device Q3.

Reactor R3 contains, on a fixed bed, a hydrodesulfurization catalyst containing about 15% by weight of molybdenum oxide $MoO_3$ and 3% by weight of nickel oxide deposited on alumina.

The temperature in reactor R3 ranges from 370° to 430° C., preferably from 380° to 420° C., with an average and a maximum temperature lower than the first two reactors R1 and R2 by 10° to 15° C.

The pressure is the same as in reactors R1 and R2, limited to that of the soaker, except for the pressure drops.

When it comes out of reactor R3, through line 20, the effluent of said reactor is led through line 22, after addition through line 21 of a quenching fluid, preferably cold hydrogen, into a second hydrodesulfurization reactor R4 equipped with a quenching device Q4.

Reactor R4 contains the same catalyst as reactor R3 and the operating conditions are the same.

In order to minimize the pressure drops in the whole reactors R1, R2, R3 and R4, reactors R3 and R4 can be advantageously placed in parallel instead of in series as represented on the figure.

For the charges where the content of metals (Ni, V, Fe, Na) and of pollutants (C, $SiO^2$, $Al^2$, $Al^2O^3$) is higher than 250 ppm by weight, implying a cycle time of the R1 catalysts shorter than 6 months, two identical reactors R1 and R'1 can be placed in parallel, one in readiness and the other in operation and optionally two series of reactors (R1+R2) and (R'1+R'2), one in readiness and the other in operation, so that the whole unit can run uninterrupted for a year.

These arrangements also allow to be practically sure that the clogging of the catalytic beds by the catalytic residues from the hydrovisbreaking process will be avoided.

When it comes out of reactor R4, the effluent from said reactor is led through line 23, after passing through a cooler 34, into a warm separator S1.

One collects at the outlet of separator S1:
a liquid fraction through line 24
a gaseous fraction through line 25.

The liquid fraction is led into a distillation tower D.

One collects at the outlet of said tower:
a light fraction through line 26
a heavy fraction through line 27
a residue through line 28.

The gaseous fraction from line 25 is led, after passing through a cooler 29, into a cold separator S2 which separates:
a liquid fraction which is led through line 30 to line 24 and to the distillation D,
a hydrogenated gaseous fraction which, through line 31, is led, by means of compressor C, to a purification stage P implying an amine treatment and possibly a gas-oil washing of the hydrogenated gas.

The purified hydrogenated gas, which has been reconcentrated in hydrogen and gathered through line 32, can be partly mixed with the make-up gas through line 6 or redistributed towards the various quenching devices through line 33.

Examples 1 to 13 relate to the preparation of catalytic compositions according to the invention, which can be used in the process of catalytic hydrovisbreaking according to the invention, and to pilot compositions and hydrovisbreaking tests carried out with these compositions.

Example 14 concerns hydrotreatment tests according to the integrated hydrotreatment process including the catalytic hydrovisbreaking process according to the invention by means of compositions prepared in the previous examples.

EXAMPLE 1

A concentrate of a catalytic composition (A) is prepared according to the invention, as described below. 200 g of phosphomolybdic acid of the formula 12 Mo $O_3$, $PO_4 H_3$, 29 $H_2O$, with 49% by weight of molybdenum, marketed by the PROLABO Company, are dissolved in 909 g of isopropanol. The alcohol solution of the phosphomolybdenic acid is introduced into a stainless steel reactor equipped with a stirring system and containing a mixture, maintained at 150° C., of 15,760 g of an LCO, 764 g of a vacuum residue of a SAFANIYA heavy petroleum of Arab origin, and 545 g of polysulfide TPS 32 marketed by ELF AQUITAINE (ditertiododecyl pentasulfide). The mixture is maintained at 150° C. under scavenging of a substantially pure hydrogen and under constant stirring for the whole duration (about 60 minutes) of the adding of the phosphomolybdic acid solution, then the stirring and the hydrogen scavenging go on for 45 more minutes, at 150° C. The mixture which has been thus prepared contains 0.53% by weight of molybdenum (metal weight) and the ratio by weight of molybdenum to asphaltenes is 1.20. This mixture is then brought up to 390° C. under a hydrogen pressure of 10 MPa, under constant stirring, and these conditions are maintained for 30 minutes. The product

11 which is then obtained constitutes a concentrate of a catalytic composition A according to the invention, containing very fine solid particles in suspense. The LCO cut utilized for the preparation of the catalytic composition A is a cut resulting from the fluid catalytic cracking with an initial point (according to the ASTM D 1160 standard of distillation) of 160° C. and an end point of 341° C., a viscosity at 50° C. of 2.15 MPa×and a density at 20° C. of 0.996. This cut contains no n-heptane insoluble.

The SAFANIYA vacuum residue shows a density at 20° C. of 1.022, a viscosity at 50° C. of 160,000 MPa×s, a content of n-heptane insoluble asphaltenes of 10.7% by weight and 89% by weight of this residue distilled at a temperature exceeding 500° C.

A 20 g sample of the catalytic composition A is filtered on a 0.2 micron millipore filter. The solid is washed with toluene and then dried under nitrogen at 120° C. 0.56 g of a solid containing 18.7% by weight of molybdenum and 22% by weight of sulfur is thus obtained.

EXAMPLE 2

Comparison

A concentrate of a catalytic composition (B) is prepared following the operating method described in example 1 but by replacing the organic polysulfide by 545 g of a LCO cut. The introduction of the phosphomolybdic acid solution is carried out under hydrogen scavenging for 30 minutes and continued for 30 minutes by having a current of gas containing hydrogen and hydrogen sulfide instead of substantially pure hydrogen bubble at 150° C., the $H_2S$ content being 13.6% by volume and the gas flow rate being maintained at 20 liters per minute. The bubbling of the gas containing $H_2+H_2S$ is carried on for 15 minutes and then replaced by a 30 minutes substantially pure hydrogen scavenging. The amount of sulfur introduced following that way is identical to that which has been introduced in example 1 by means of TPS 32. The solution is then brought up to 390° C. under a hydrogen pressure of 10 MPa and under stirring for 30 minutes. The product which is obtained constitutes a concentrate of a catalytic composition B, which is not in accordance with the present invention and contains fine solid particles in suspense.

EXAMPLE 3

A concentrate of a catalytic composition (C) according to the invention is prepared following the operating method described in example 1 but using 4,582 g of SAFANIYA vacuum residue and 11,495 g of LCO. The ratio by weight of molybdenum to asphaltenes is then 0.2 and the molybdenum content is 0.53% by weight of metal.

EXAMPLE 4

Comparative

A concentrate of a catalytic composition (D) is prepared following the operating method described in example 1 but using 30,545 g of SAFANIYA vacuum residue and no LCO. The ratio by weight of molybdenum to asphaltenes is then 0.03 and the molybdenum content is 0.3% by weight of metal.

EXAMPLE 5

Comparative

A concentrate of a catalytic composition (E) is prepared following the operating method described in example 1 but using 76 g of SAFANIYA vacuum residue and 16,541 g of LCO. The ratio by weight of molybdenum to asphaltenes is then 12 and the molybdenum content is 0.53% by weight of metal.

EXAMPLE 6

Comparison

A concentrate of a catalytic composition (F) is prepared following the operating method described in example 1 but by operating during the heating at 150° C. for 105 minutes under nitrogen scavenging.

EXAMPLE 7 to 12

The catalytic activity of the concentrates of catalytic compositions A to F prepared in examples 1 to 6 is tested in a 250 cm$^3$ stainles steel PROLABO pressure-heater stirred in jerks, in which are introduced 50 g of BOSCAN topped crude with the characteristics describe below (Table I) and an amount of concentrate of catalytic composition such that the molybdenum content is 100 ppm by weight in relation to the charge.

The pressure-heater is subjected to a hydrogen scavenging and then pressurized, at room temperature, under a pressure of 10 MPa with a hydrogen-hydrogen sulfide mixture containing 95% by volume of hydrogen and 5% by volume of hydrogen sulfide.

The stirred pressure-heater is heated in order to bring the temperature up to 430° C. after one hour. This temperature is maintained for 30 minutes and the pressure-heater is then rapidly cooled; the pressure is measured after it has come back to the room temperature.

The pressure-heater is then depressurized. The gases are measured by means of a gas meter and analyzed by chromatography in the gaseous phase.

The reaction medium is diluted with toluene and filtered with a 0.2 micron millipore filter. The solids are washed with warm toluene (80° C.). The filtrate and the toluenic washing solution are mixed and vacuum evaporated. The evaporation residue consititutes the total effluent by means of which the sulfur, $C_5$ and $C_7$ asphaltenes and the metals (nickel and vanadium) percentages will be determined.

The solids collected by filtration are analyzed to know the composition in elements C, H, N, S, Ni, V, Mo.

The amount of coke formed during the test is calculated in relation to the charge from the percentage of carbon in the tolune insolubles gathered by filtration.

Table II presents the obtain results.

It can be observed that the catalytic compositions A and C, examples 7 and 9 according to the invention, allow to obtain higher sulfur, asphaltenes and metals removal rates and a coke forming which is lower than that which is obtained with the catalytic compositions that are not in accordance with the invention, that is B, D, E and F, examples 8, 10, 11 and 12.

TABLE I

| CHARACTERISTICS OF THE BOSCAN TOPPED CRUDE | | |
|---|---|---|
| Density at 20° C. | | 1.002 |
| Viscosity at 50° C. | MPA × s | 6,535 |
| Viscosity at 100° C. | MPA × s | 239 |

TABLE I-continued

| CHARACTERISTICS OF THE BOSCAN TOPPED CRUDE | | |
|---|---|---|
| Sulfur | % by weight | 5.3 |
| Nitrogen | ppm by weight | 5,600 |
| Conradson carbon | % by weight | 15.3 |
| $C_5$ asphaltenes | % by weight | 20.3 |
| $C_7$ asphaltenes | % by weight | 12.8 |
| Nickel | ppm by weight | 100 |
| Vanadium | ppm by weight | 1,040 |
| Carbon | % by weight | 84.1 |
| Hydrogen | % by weight | 10.3 |

TABLE II

| | EXAMPLE | | | | | |
|---|---|---|---|---|---|---|
| | 7 | 8 | 9 | 10 | 11 | 12 |
| | CATALYTIC COMPOSITION | | | | | |
| | A | B* | C | D* | E* | F* |
| REMOVAL RATE (% by wt) | | | | | | |
| Sulfur | 30 | 25 | 29 | 28 | 23 | 20 |
| $C_5$ asphaltenes | 44 | 38 | 42 | 40 | 35 | 32 |
| $C_7$ asphaltenes | 36 | 31 | 38 | 32 | 30 | 28 |
| Metals | 17 | 12 | 16 | 15 | 10 | 10 |
| % by weight of formed coke in relation to the charge weight | 0.2 | 0.25 | 0.2 | 0.30 | 0.32 | 0.35 |
| 500° C.+ conversion | 39.5 | 29.5 | 40.5 | 30 | 28 | 28.5 |

*Comparative examples

The 500° C.+conversion is the conversion of the fraction of the charge the boiling point of which is higher than 500° C.

EXAMPLE 13

A concentrate of a catalytic composition (G) is prepared according to the invention, following the operating method described in example 1 but using TPS 37 (ditertiononyl pentasulfide) instead of TPS 32.

The catalytic activity of the concentrate of catalytic composition G is tested following the operating method described in examples 7 to 12. The results obtained with catalytic composition G are substantially the same as those obtained with catalytic composition A.

EAXMPLE 14

In a pilot plant identical to that which is represented on the Figure, tests relative to the integrated process for hydrotreating a hydrocarbon charge are carried out, which combine the following processes:
(1) catalytic hydrovisbreaking (according to the invention or pilot)
(2) catalytic hydroemetallization
(3) catalytic hydroesulfurization.

The charge is a topped crude the characteristics of which are given in Table I above.

The tests have been carried out by using, during the catalytic hydrovisbreaking, the catalytic compositions A, B and C prepared in examples 1, 2 and 3.

The pressure in the soaker is 14.5 MPa and the pressure drop in the unit, determined between the recycle compressor (C on the figure) inlet and outlet is 0.75 MPa.

The other operating conditions appear in Table III hereafter:

TABLE III

| | SOAKER (10) | R1 | R2 | R3 | R4 |
|---|---|---|---|---|---|
| Residence time (h) | 0.33 | 1 | 1 | 1 | 1 |
| $H_2$/HC (l/l) | 550 | 670 | 790 | 810 | 930 |
| Inlet temperature °C. | 432 | 385 | 400 | 380 | 380 |
| Outlet temperature °C. | 418 | 405 | 415 | 390 | 390 |

The cahracteristics of the catalyst utilized in reactors R1, R2, R3 and R4 appear in Table IV hereafter:

TABLE IV

| CATALYST | AF | BF | CF | EF |
|---|---|---|---|---|
| SUPPORT | | | | |
| Nature | $Al_2O_3$ | $Al_2O_3$ | $Al_2O_3$ | $Al_2O_3$ (c) |
| Structure | acicular | acicular | acicular | non acicular |
| Acidity (joules/g) | 24 | 23 | 25 | 41 |
| diameter equivalent (cm) | 0.42 balls | 0.28 balls | 0.18 balls | 0.125 extrud. |
| CATALYST | | | | |
| surface (m²/g) | 142 | 138 | 147 | 219 |
| total pore volume (cm³/g) | 0.96 | 0.93 | 0.93 | 0.91 |
| pore volume >1 μm | 0.22 | 0.18 | 0.17 | 0.03 |
| pore volume >0.1 μm | 0.34 | 0.33 | 0.32 | 0.08 |
| pore volume <10 nm | 0.07 | 0.09 | 0.11 | 0.13 |
| $MoO_3$ % by weight | 14.2 | 14.3 | 14.3 | 14.8 |
| NiO % by weight | 2.9 | 3.1 | 3.0 | 3.1 |
| Bed density | 0.55 | 0.57 | 0.57 | 0.56 |

The way the reactors are charged is described in Table V below:

TABLE V

| RESULTS | TEST 1 | TEST 2 (comparative) | TEST 3 |
|---|---|---|---|
| Reactors charging: | | | |
| R1 | ← | 20% AF | → |
| | ← | 30% BF | → |
| | ← | 50% CF | → |
| R2 | ← | CF | → |
| R3 | ← | EF | → |
| R4 | ← | EF | → |
| Catalytic composition for the hydro-visbreaking | A | B | C |

For hydrovisbreaking, the amount of catalytic composition that is used is such that there are 100 ppm of molybdenum in relation to the charge.

The results are expressed by giving the conversion of the fraction of the charge the boiling point of which exceeds 500° C. (500° C.+ herafter).

Conversion 500° C.+ in % by weight
Test 1:77
Test 2:66
Test 3:76

Since the asphaltenes, sulfur and metals removal rates during the catalytic hydrovisbreaking in Tests 1 and 3 are higher, the service life of the hydrodemetallization and hydrodesulfurization catalysts is improved.

This example illustrates well the significance of the integrated process utilizing the catalytic hydrovisbreaking process according to the invention.

We claim:
1. A process for catalytic hydrovisbreaking of a hydrocarbon charge comprising the following stages:
(a) mixing the charge with a gas containing hydrogen in amount sufficient to carry out the hydrovisbreaking reaction and bringing the mixture up to a temperature of at least 330° C.,

(b) introducing into the hydrogen-hydrocarbon charge mixture an amount of a catalytic composition that is sufficient to obtain a content of metal in the charge ranging from about 10 to 2,000 ppm by weight in relation to the weight of the charge, said catalytic composition being obtained with a method comprising the following stages:

(1) subjecting to a thermal treatment at a temperature ranging from 80° to 250° C. for a duration ranging from 0.1 to 24 hours, under a globally reducing atmosphere of a gas containing hydrogen, a mixture obtained by contacting, in any order, at least one compound other than a sulfide of at least one metal of groups VI B, and VII B of the periodic table of elements, with a hydrocarbon charge containing asphaltenes and with at least one organic polysulfide of the formula $R^1-(S)_n-R^2$, where $R^1$ and $R^2$ are identical or different, each representing a hydrocarbon radical having five to 150 carbon atoms and n being an intergral number from 2 to 20, the amounts of metal compound and of asphaltenes being such that the ratio by weight of metal to asphaltenes ranges from about 0.05:1 to 10:1 and the amount of organic polysulfide which is utilized being sufficient to introduce an amount of sulfur at least equal to the amount of sulfur necessary for the substantially complete conversion of the major part of the metal present into a sulfurized metallic compound which is a catalytic precursor, and (2) heating the product resulting from stage (b) in the presence of a gas containing hydrogen under a partial hydrogen pressure ranging from about 0.5 to 20 MPa, at a temperature ranging from about 260° to 450° C. for 0.1 to 24 hours, and (c) subjecting the product resulting from stage (b) to hydrovisbreaking conditions for a time sufficient for carrying out hydrovisbreaking of the charge.

2. A process according to claim 1 wherein, during stage (a), the hydrogen-hydrocarbon charge is brought to a temperature ranging from about 350° to 450° C. and the amount of hydrogen introduced in relation to the charge ranges, in volume, measured at a standard temperature and pressure, from about 100:1 to 5,000:1.

3. A process according to claim 1 wherein the amount of metal introduced by means of the catalytic composition in stage (b) ranges from about 25 to 500 ppm by weight in relation to the charge.

4. A process according to claim 1 wherein the catalytic composition comprises a metal selected from the group consituted by molybdenum.

5. A process according to claim 1 wherein the metal compound used for preparing the catalytic composition is selected from the group consisting of molybdenum blues, organic acid molybdenum salts, phosphomolybdic acid and phosphomolybdic acid slats.

6. A process according to claim 1, wherein the metal is a group VII B metal.

7. A process according to claim 1, wherein $R^1$ and $R^2$ are a hydrocarbon radial having at least seven carbon atoms.

* * * * *